United States Patent [19]

Iizuka et al.

[11] Patent Number: 4,829,321
[45] Date of Patent: May 9, 1989

[54] OPTICAL PRINTER HEAD WITH A LIGHT EMITTING DIODE ARRAY

[75] Inventors: Hisao Iizuka, Ibaraki; Shigetoshi Hiratsuka, Kanagawa; Kiyohiko Tanno, Ibaraki; Teruji Satou; Norihiro Ashizuka, both of Ibaraki, all of Japan

[73] Assignees: Hitachi Cable, Ltd.; Hitachi, Ltd., both of Tokyo, Japan

[21] Appl. No.: 184,074

[22] Filed: Apr. 20, 1988

[30] Foreign Application Priority Data

Apr. 23, 1987 [JP] Japan .................. 62-101087
Apr. 23, 1987 [JP] Japan .................. 62-101088
Apr. 23, 1987 [JP] Japan .................. 62-101089

[51] Int. Cl.$^4$ .......................... G01D 9/42; H01J 40/14
[52] U.S. Cl. .................. 346/107 R; 250/578; 358/302
[58] Field of Search .................. 346/107 R, 108, 160; 358/296, 300, 302; 250/560, 578

[56] References Cited

U.S. PATENT DOCUMENTS

4,751,522 6/1988 Henzi ............................ 346/107 R
4,780,730 10/1988 Dodge ............................ 346/108

Primary Examiner—E. A. Goldberg
Assistant Examiner—Mark Reinhart
Attorney, Agent, or Firm—Lowe, Price, LeBlanc, Becker & Shur

[57] ABSTRACT

An optical printer head with a light emitting diode array comprises means for setting a distance between a light emitting surface of a light emitting diode array chip and a rod lens array. The means is provided with two reference position levels at which the light emitting diode array chip and the rod lens array are held. Therefore, there is no necessity for adjusting the distance between the light emitting diode array chip and the rod lens array so that a productivity thereof is much improved.

8 Claims, 5 Drawing Sheets

OPTICAL PRINTER HEAD WITH A LIGHT EMITTING DIODE ARRAY

FIELD OF THE INVENTION

The invention relates to an optical printer head with a light emitting diode array, and more particularly to an optical printer head with a light emitting diode array which is applied to a light source for a light exposure means in an optical printer.

BACKGROUND OF THE INVENTION

A conventional optical printer head with a light emitting diode array comprises a light emitting diode array chip mounted on a ceramic substrate, and a rod lens array (generally called by a trademark "SELFOC LENS ARRAY") for focusing exposure lights radiated from the light emitting diode array chip on a photosensitive medium of an optical printer. The light emitting diode array chip is driven in accordance with image signals read from an image memory by a driver integrated circuit which is also mounted on the ceramic substrate. The ceramic substrate is fixed to a base plate above which the rod lens array is held by fixing members. For this purpose, the rod lens array is fixed to the fixing members by use of eccentric screws.

In the optical printer head described above, an eccentric degree of the eccentric screws are adjusted when the rod lens array is fixed to the fixing members so that the rod lens array is positioned with a predetermined distance which is determined in accordance with focal lengths of rod lenses for the rod lens array from the light emitting surface of the light emitting diode array chip.

Further, a common line pattern for the light emitting diode array chip and a ground line pattern for the driver integrated circuit are provided on the ceramic substrate.

In operation, electric current of light emitting diodes which are driven in accordance with image signals is flowed from the light emitting diode array chip through the common line pattern to the ground, and electric current by which logic circuits in the driver integrated circuits are activated is flowed from the driver integrated circuit through the ground line pattern to the ground.

According to the conventional optical printer head, however, an eccentric degree of the eccentric screws are adjusted to minimize sizes of beam spots radiated from the light emitting diode array chip which are monitored when the rod lens array is fixed to the fixing members. For this reason, there is a disadvantage that a productivity of the optical printer head is decreased. Such a assembling procedure must be performed at each time of routine inspections or repairs of the optical printer head.

There is a further disadvantage that a distance between the rod lens array and the light emitting surface of the light emitting diode array chip is deviated off a predetermined distance due to the change of a temperature, vibrations and so on even if the rod lens array is fixed with the predetermined distance from the light emitting diode array chip because an eccentric screw is difficult to keep a predetermined fixing force for a long time.

There is a still further disadvantage that a printing mode in which all dots of a printing line are black is difficult to be conducted. This is a reason why electric current of 17 to 20A is flowed in the ground line pattern and the common line pattern when such a printing mode is performed so that a voltage drop of several volts is occured therein. As a result, normal operations are not expected to be performed in the light emitting diode array chip and the driver integrated circuit. In such an occasion, the aforementioned printing mode must be performed in such a manner that a printing line is divided into a predetermined number of groups which are printed sequentially. Otherwise, an extra power source 20 to 30 V must be prepared to print in the aforementioned printing mode. In a case where such a power source is provided therein, a circuit matching will be difficult to be made between the extra power source and remaining logic circuits nomally requiring a power source voltage of 5 V, and an evenness of printing densities is not kept because the difference of voltage drops is large between an input and output terminals of the ground and common line patterns. The ground and common line patterns are difficult to be thick to a desired extent thereby resulting in the decrease of resistance values because the patterns are normally provided with a thickness of 5 $\mu$m by using the thin film process and with a thickness of 100 $\mu$m by using the thick film process.

SUMMARY OF THE INVENTION

Accordingly, it is an object of the invention to provide an optical printer head with a light emitting diode array in which a productivity thereof is much improved.

It is a further object of the invention to provide an optical printer head with a light emitting diode array in which a distance between the rod lens array and the light emitting surface of the emitting diode array chip is kept to be a predetermined distance which is determind in accordance with focal lengths of the rod lenses for a long time even under a situation where a temperature is fluctuated and vibrations are induced.

It is a still further object of the invention to provide an optical printer head with a light emitting diode array by which a printing mode in which all dots of a printing line are black is performed without the necessity of an extra power source or a sequentially dividing printing mode.

According to the invention, an optical printer head with a light emitting diode array comprises, a light emitting diode array chip for radiating exposure lights which is mounted on a substrate, a driver integrated circuit for driving said light emitting diode array chip which is also mounted on said substrate, a rod lens array which is provided at a position of a predetermined distance from the light emitting surface of said light emitting diode array chip, and means having two reference position levels at which said light emitting diode array chip and said rod lens array are held so that a distance between said light emitting diode array chip and said rod lens array is set to said predetermined distance on axes of lights radiated from said light emitting diode array chip.

BRIEF DESCRIPTION OF THE DRAWINGS

The invention will be explained in more detail in conjunction with follwing drawings wherein.

DESCRIPTION OF THE PREFERRED EMBODIMENTS

Before explaining an optical printer head with a light emitting diode array in an embodiment according to the invention, a conventional optical printer head with a light emitting diode array briefly described before will be explained in FIGS. 1A and 1B.

Figure 1A:
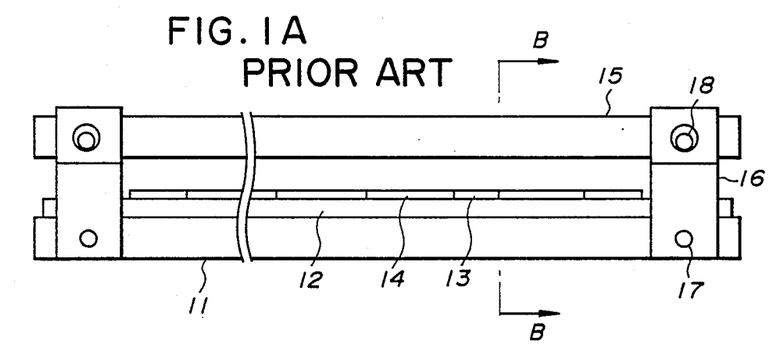
FIGS. 1A and 1B are a front view and a cross sectional view cut along a line B—B showing a conventional optical printer head with a light emitting diode array.
Figure 1B:
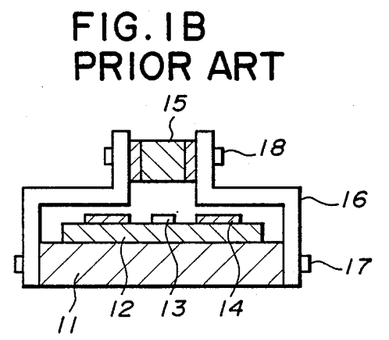

The optical printer head comprises a base plate 11, a ceramic substrate 12 which is fixed with adhesives like a resin etc. to the base plate 11, a light emitting diode array chip 13 mounted on the ceramic substrate 12, a driver integrated circuit 14 also mounted on the ceramic substrate 12, a rod lens array 15 for focusing exposure lights on a photosensitive medium of a printer (not shown), and fixing members 16 which are held to the base plate 11 by use of screws 17 for fixing the rod lens array 15 on light axes of the light emitting diode array chip 13 by use of eccentric screws 18.

In the optical printer head described above, an eccentric degree of the eccentric screws 18 is adjusted when the rod lens array 15 is held through the fixing member 16 to the base plate 11 so that the rod lens array 15 is positioned with a predetermined distance based on focal lengths of rod lenses for the rod lens array 15 from the light emitting surface of the light emitting diode array chip 13.

Figure 2A:
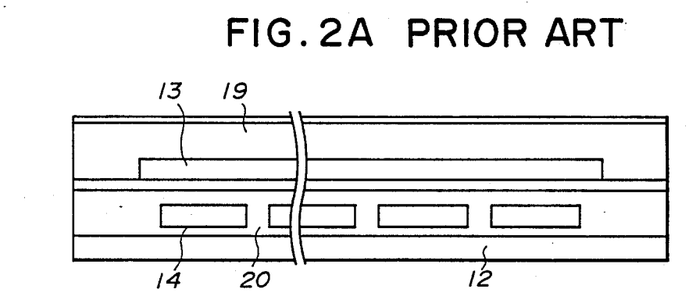
FIGS. 2A and 2B are a top plain and side views showing a light emitting diode array chip and a driver integrated circuit respectively mounted on a ceramic substrate in the conventional optical printer head with a light emitting diode array in FIGS. 1A and 1B.
Figure 2B:
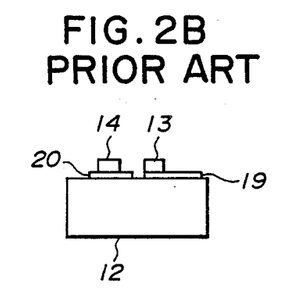

In FIGS. 2A and 2B, there is shown a ceramic substrate 12 on which a light emitting diode array chip 13 is mounted along with a driver integrated circuit 14. Further, a common line pattern 19 for the light emitting diode array chip 13 and a ground line pattern 20 for the driver integrated circuit 14 are provided on the ceramic substrate 12.

Figure 3:
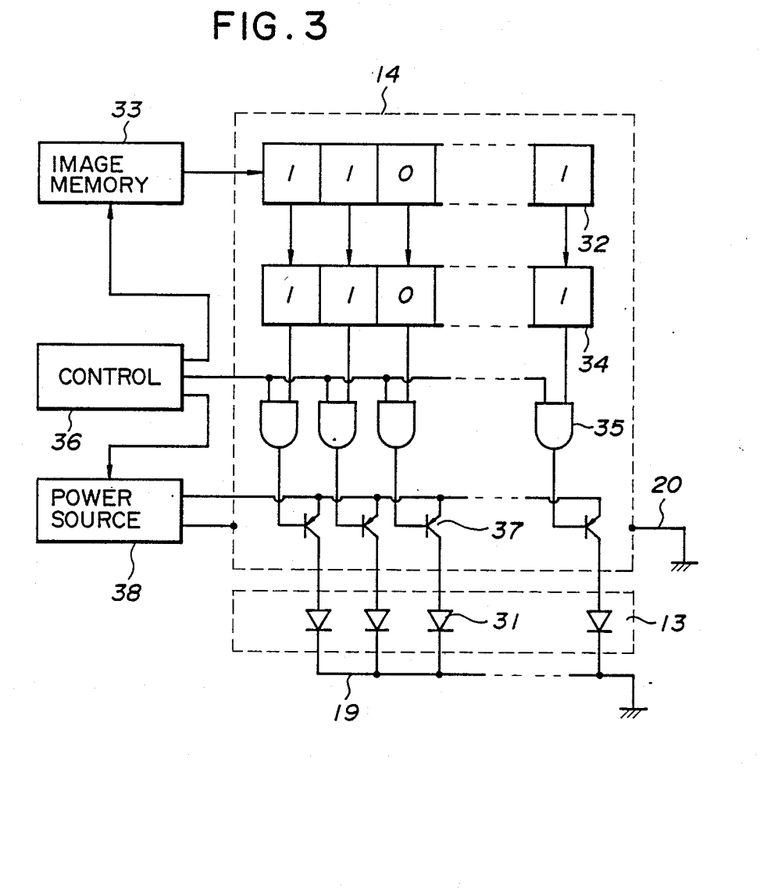
FIG. 3 is a block diagram showing the light emitting diode array chip and the driver integrated circuit in FIGS. 2A and 2B, FIGS. 4A and 4B are a longitudinal cross sectional view and a cross sectional view cut along a line B—B showing an optical printer head with a light emitting diode array in a first embodiment according to the invention.

The light emitting diode array 13 and the driver integrated circuit 14 will be explained in more detail in FIG. 3. The light emitting diode array 13 includes a predetermined number of light emitting diodes 31 which are arranged in a density of eight or sixteen light emitting diodes 31 per 1 mm. For instance, 3520 light emitting diodes 31 are provided for a light emitting diode array of an optical printer which is used in printing an image on A3 size of a recording medium. In each of the light emitting diodes 31, a cathode electrode is connected through a common line 19 to the ground. The driver integrated circuit 14 includes a shift register 32 into which image signals are read from an image memory 33, a latch register 34 in which the image signals of the shift register 32 are latched, AND gates 35 equal in number to the predetermined number of the light emitting diodes 31 to which a driving signal is applied from a control unit 36, and switching transistors 37 equal in number to the AND gates 35 each turned on by receiving a signal "1" from a corresponding AND gate 35 thereby applying a predetermined voltage of a power source 38 to an anode electrode of a corresponding light emitting diode 31. In the driver integrated circuit 14, a predetermined voltage is applied from the power source 38 to each logic circuit which is connected through a ground line 20 to the ground. Although a predetermined number of ground lines are provided for logic circuits included in the driver integrated circuit 14, only one ground line 20 is shown for illustration in FIG. 3.

In operation, image signals which are read from the image memory 33 are transferred to the shift register 32 in accordance with a control signal of the control unit 36. The image signals thus transferred to the shift register 32 are latched in the latch register 34. Under the situation, a driving signal is supplied from the control unit 36 to the AND gates 35 so that signals "1" are applied to some of the transistors 37 from the AND gates 35 corresponding to image signals "1" of the latch register 34. As a result, the transistors 37 to which the signals "1" are applied are returned on so that exposure lights are rediated from light emitting diodes 31 which are connected to the transistors 37 thus turned on. A photosensitive medium of a printer like a photosensitive drum is exposed to the exposure lights from the light emitting diodes 31 whereby a latent image which will be developed with toners is produced thereon.

Figure 4A:
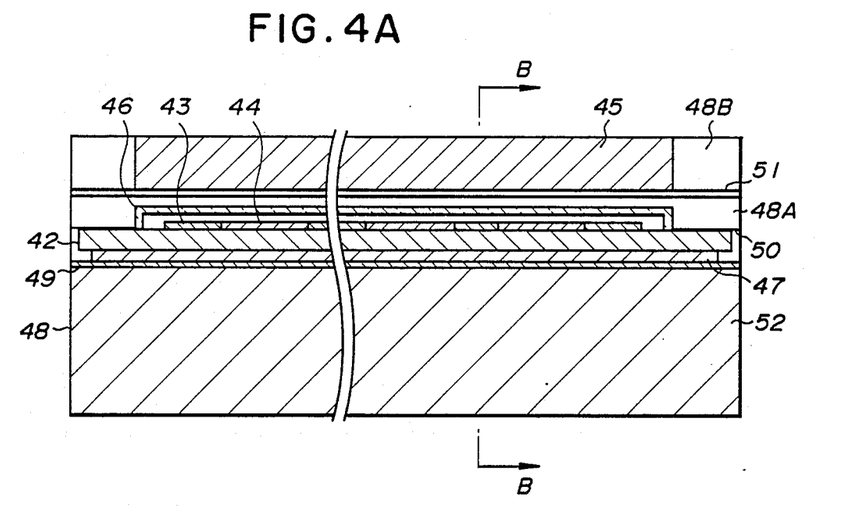
Figure 4B:
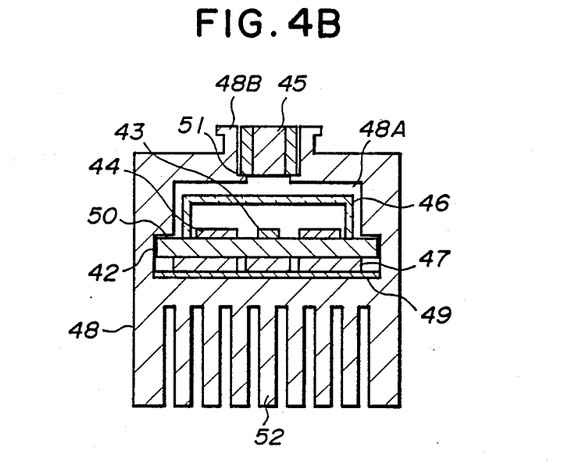

Next, there is shown an optical printer head with a light emitting diode array in a first embodiment according to the invention in FIGS. 4A and 4B. The printer head comprises a ceramic substrate 42, a light emitting diode array chip 43 and a driver integrated circuit 44 respectively mounted on a ceramic substrate 42, a rod lens array 45 positioned at a predetermined distance from the light emitting diode array chip 43, a glass cover 46 for protecting the light emitting diode array 43 and the driver integrated circuit 44, a composite metal member 47 soldered to the back surface of the ceramic substrate 42, and a body member 48 having a hollow portion 48A in which the ceramic substrate 42 etc. are provided through an insulation sheet 49 on the bottom plain thereof and arm portions 48B between which the rod lens array 45 is held. In the body member 48, there are provided first projections 50 at both side walls of the hollow portion 48A which are in contact with the top surface of the ceramic substrate 42, second projections 51 at tip and lower portions of the arm portions 48B on which the rod lens array 45 is positioned, and a plurality of heat radiating fins 52. The composite metal member 47 is composed of, for instance, three layers of copper, invar and copper to have the same coefficient of thermal expansion as that of the ceramic substrate 42, and is a member for reinforcing a common and ground lines which are wired on the back surface of the ceramic substrate 42. The common and ground lines are connected to the composite metal member 47, and further through through-holes provided in the ceramic substrate 42 to a common and ground lines formed on the top surface of the ceramic substrate 42.

In the optical printer head with a light emitting diode array described above, resistance values of the common and ground lines for the light emitting diode array chip 43 and the driver integrated circuit 44 are much decreased to be negligible for voltage drops therein so that a better printing operation can be performed for the reason why the composite metal member 47 is provided. Further, this results in a better heat radiating effect so that the light emitting diode array chip 43 and the driver integrated circuit 44 are operated in a very stable condition.

As mentioned before, the ceramic substrate 42 on the top surface of which the light emitting diode array chip 43 and the driver integrated circuit 44 are mounted and on the back surface of which the composite metal member 47 is provided is inserted into the hollow portion 48A of the body member 48 so that the ceramic substrate 42 is held under the projections 50. In a practical use, the ceramic substrate 42 can be easily inserted in the hollow portion 48A if a gap of at least 0.05 mm is given between the top surface of the ceramic substrate 42 and the plains of the projections 50 facing the ceramic substrate 42. For this purpose, there may be provided projections on which the ceramic substrate 42 is positioned. In other words, the projections are provided to be placed under the back surface of the ceramic substrate 42 because it is rather easy that the ceramic substrate 42 is processed to have a predetermined thickness with a high precision. In such a case, a width of the hollow portion 48A of the main body 48 is wider above the projections than that of the ceramic substrate 42 so that the ceramic substrate 42 is easily inserted into the hollow portion 48A.

The rod lens array 45 is held on the projections 51 which are provided on the tip and lower walls of the arm portions 48B of the main body 48. As a matter of course, a difference of position levels is set to be focal lengths of the rod lenses for the rod lens array 45 between the projections 50 and 51. Therefore, a distance is precisely set to be focal lengths of the rod lenses between the light emitting surface of the light emitting diode array chip 43 and the rod lens array 45 when the ceramic substrate 42 is processed beforehand to have a predetermined thickness considering that a gap is necessary between the projections 50 and the ceramic substrate 42 in a case where the ceramic substrate 42 is held under the projections 50, while it is not necessary to consider a gap in a case where the ceramic substrate 42 is held on projections.

For the purpose of setting a distance between the light emitting diode array chip 43 and the rod lens array 45 to be a predetermined distance, a thickness error of the light emitting diode array chip 43 and that of solder for soldering the chip 43 to the substrate 42 must be less than respective values based on a tolerance of, for instance, ±0.1 mm of focal lengths of the rod lens array 45. In this respect, the thickness error of the light emitting diode array 43 can be less than several μm, and that of the solder can be less than ±0.01 mm. This means that a distance which is set between the light emitting diode array chip 43 and the rod lens array 45 by the projections 50 and 51 of the main body 48 is not affected in regard to the tolerance of the focal length by the thickness errors of the light emitting diode array chip 43 and the solder.

The rod lens array 45 is fixed between the arm portions 48B thereto by screws (not shown) which are screwed through side walls of arm portions 48B, and the ceramic substrate 42 is fixed to the main body 48 by screws (not shown) which are screwed from the upper surface of the main body 48. These screws are positioned at points where lights emitted from the light emitting diode array chip 43 are not interrupted. The main body 48 is made of aluminum by the extrusion process so that a complicated structure having the hollow portion 48A, the arm portions 48B, the projections 50 and 51, and the heat radiating fins 52 is easily manufactured with a high precision.

As described above in detail, the optical printer head with a light emitting diode array in the first embodiment is provided with the main body 48 having the hollow portion 48A which is formed with the projections 50 for holding the top surface of the ceramic substrate 42 at a predetermined position level and the arm portions 48B which are formed with the projections 51 for holding the rod lens array 45 at the other predetermined position level so that the light emitting surface of the light emitting diode array 43 is precisely positioned at a line including focal length of the rod lens array 45. Further, the optical printer head with a light emitting diode array is assembled only by fixing the ceramic substrate 42 which is inserted into the hollow portion 48A of the main body 48 thereto and the rod lens array 45 which is positioned between the arm portions 48B of the main body thereto thereby providing a good productivity. Still further, the main body 48 can be processed with a high precision to be provided with the hollow portion 48A having the projections 50 and the arm portion 48B having the projections 51, and the ceramic substrate 42 and the rod lens array 45 are thereby held to be fixed to the main body 48 so that a high reliability is obtained even under a situation where a temperature is fluctuated and vibrations are induced.

Figure 5:
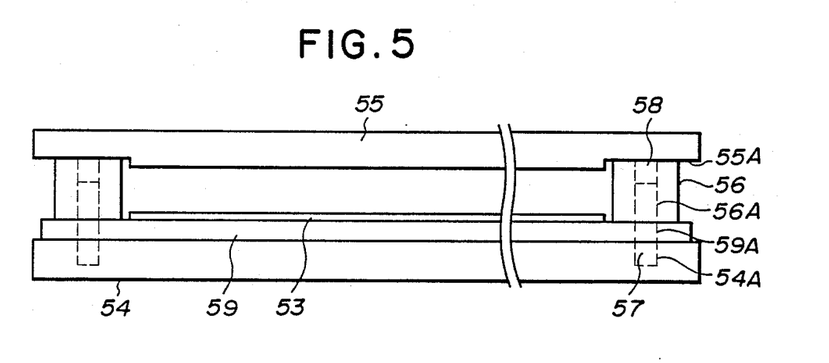
FIG. 5 is a front view showing an optical printer head with a light emitting diode array in a second embodiment according to the invention.

In FIG. 5, there is shown an optical printer head with a light emitting diode array in a second embodiment according to the invention. The optical printer head comprises a base plate 54, a ceramic substrate 59 on which a light emitting diode array chip 53 and a driver integrated circuit (not shown) are mounted, and a rod lens array 55 which is fixed through spacer members 56 to the base plate 54. The base plate 54 is formed with apertures 54A in which fixing pins 57 are fixed to the base plate 54, and the ceramic substrate 59 is formed with apertures 59A through which the fixing pins 57 are passed to reach the the apertures 54A of the base plate 54. The rod lens array 55 is formed with reference position plains 55A with which the spacer members 56 are in contact at one end thereof. Each of the spacer members 56 is formed with a hollow 56A through which the fixing pin 57 and another fixing pin 58 are inserted.

The fixing pins 57 and 58 are, for instance, of ceramic wherein the fixing pin 57 fixes the spacer member 56 through the ceramic substrate 59 to the base plate 54 by means of screw or by use of adhesives, and the fixing pin 58 fixes the rod lens array 55 to the spacer member 56 in the same manner as the fixing pin 57. A height of the spacer member 56 is determined only in accordance with focal lengths of rod lenses for the rod lens array 55 and a height of the light emitting diode array chip 53. The height of the light emitting diode array chip 53 is a dimension from the top surface of the ceramic substrate 59 to the light emitting surface of the light emitting diode array chip 53.

In the optical printer head described above, a whole dimensional precision is dependent on a dimensional precision of the height of the spacer member 56 and that of the reference position plain 55A. In other words, an error can be less than 0.01 mm in regard to the height of the spacer member 56, and an error can be less than 0.07 mm in regard to the reference position plain 55A of the rod lens array 55 so that a total error of a distance between the light emitting surface of the light emitting diode array chip 53 and the rod lens array 55 can be less than 0.08 mm which is less than a necessary tolerance of ±0.1 mm for an optical printer head.

In the second embodiment, the fixing pins 57 and 58 may be replaced by a single pin having a length reaching the base plate 54 from the rod lens array 55. Further, an elastic member may be sandwiched between the light emitting diode array 55 and the spacer member 56 and between the spacer member 56 and the ceramic substrate 52 so that the looseness of the rod lens array 55 from the base plate 54 can be avoided for a long time.

As described above, the spacer members 56 each having a predetermined height by which the light emitting surface of the light emitting diode array chip 53 is positioned on a line including focal lengths of the rod lens array 55 are used so that no adjustment is needed in assembling the optical printer head. As a matter of course, adhesives for fixing the ceramic substrate 59 to the base plate 54 is not necessary to be used, if the fixing pins 57 and 58 are of screws, so that there is no necessity for considering that a thickness of adhesives is fluctuated. That is to say, it is an important point that the spacer member 56 is not provided between the base plate 54 and the light emitting diode array 55, but between the ceramic substrate 59 and the light emitting diode array 55 so that a thickness of a resin for fixing the ceramic substrate 59 to the base plate 54 does not affect a distance between the light emitting surface of the light emitting diode array chip 53 and the rod lens array 55.

In the second embodiment, although the spacer member 56 and the fixing pins 57 and 58 are of ceramic such as Al$_2$O$_3$, these members may be of another material having a thermal stability and a property to be processed with a high precision like silica glass or plastic material including quartz filaments. Further, although the spacer member 56 is cylindrical in the second embodiment, the spacer member 56 may be of other cross sectional shape like edged column, if it is provided with a hollow into which a fixing pin is inserted. Still further, the spacer member 56 and the fixing pins 57 and 58 may be of an integrated structure.

Figure 6A:
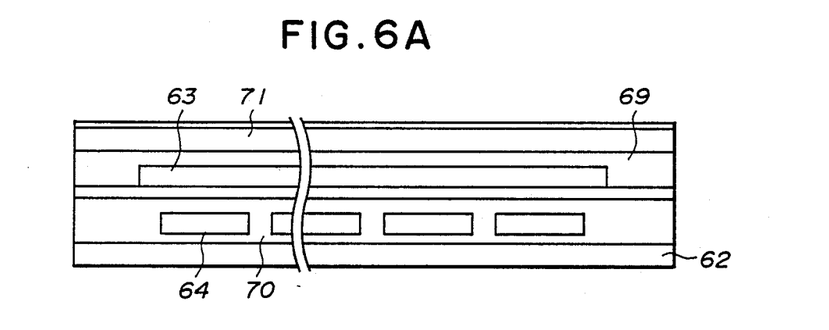
FIGS. 6A and 6B are a top plain and side views showing an optical printer head with a light emitting diode array in a third embodiment according to the invention.
Figure 6B:
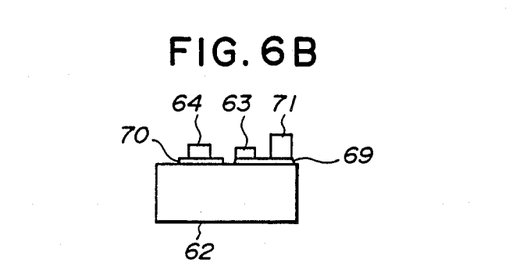

In FIGS. 6A and 6B, there is shown an optical printer head with a light emitting diode array in a third embodiment according to the invention. The optical printer head comprises a ceramic substrate 62 on which a light emitting diode array chip 63 and a driver integrated circuit 64 are mounted, and on which a common line pattern 69 and a ground line pattern 70 are provided, and a composite metal member 71 soldered to the top surface of the common line pattern 69. The composite metal member 71 is composed of, for instance, copper, invar and copper as mentioned before, and has a coefficient of thermal expansion approximately equal to that of the ceramic substrate 62 so that stress which is a cause of the composite metal member 71 to be separated from the ceramic substrate 62 is not induced therebetween thereby providing a high reliability.

The composite metal member 71 is fixed to the ceramic substrate 62 by being soldered thereto whereby the soldering thereof can be performed simultaneously with those of other parts mounted on the ceramic substrate 62 so that the number of processes is not increased and the complication thereof can be avoided. A thickness of the composite metal member 71 can be more than 1 mm without difficulty so that an ellectric resistance can be very small in the longitudinal direction. As a result, a voltage drop is less than 0.1 V to be negligible.

A printing mode in which all dots of a printing line are black was performed in an optical printer head in the third embodiment. The result thereof was that printing densities were even for all dots to result in a good printing quality.

Although the common line pattern 69 is reinforced by the composite metal member 71 in the third embodiment, the ground line pattern 70, or both of the common and ground line patterns 69 and 70 may be thereby reinforced. In a case where the common line pattern 69 and/or the ground line pattern 70 are reinforced by the composite metal member 71, the difference of voltages which are applied to the common line pattern 69 and/or the ground line pattern 70 can be less than 0.2 V at both end terminals thereof in the longitudinal direction of the ceramic substrate 62. For this reason, a good printing quality as described before is obtained without an unevenness of printing densities.

Figure 7A:
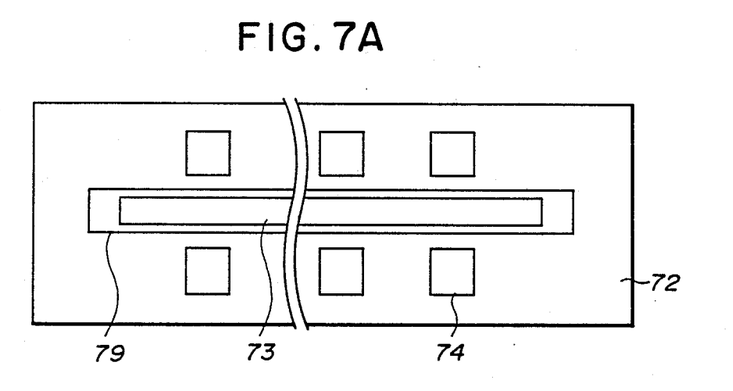
FIGS. 7A and 7B are a top plain and side views showing an optical printer head with a light emitting diode array in a fourth embodiment according to the invention.
Figure 7B:
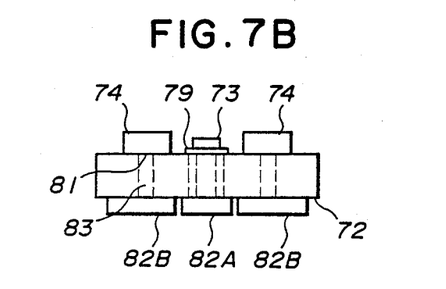

In FIGS. 7A and 7B, there is shown an optical printer head with a light emitting diode array in a fourth embodiment according to the invention. The optical printer head comprises a ceramic substrate 72 on which a light emitting diode array chip 73 and a driver integrated circuit 74 are mounted together with a common line pattern 79. The ceramic substrate 72 is formed with through-holes 81 through which leads 83 for connecting the light emitting diode array chip 73 and the driver integrated circuit 74 to composite metal members 82A and 82B are passed. Although an optical printer head in the third embodiment according to the invention is considered difficult to be small for the reason why line patterns are complicated on the top surface of the ceramic substrate 72 and a predetermined width of the composite metal member 71 must be provided thereon to reduce electric resistances to a predetermined level, an optical printer head in the fourth embodiment according to the invention can be easily small for the reason why the composite metal members 82A and 82B are provided on the back surface of the ceramic substrate 72 and are divided in the longitudinal direction of the ceramic substrate 72 into a plurality of groups, for instance, which are equal in its number to the divided groups of the driver integrated circuit 74. The composite metal members 82A and 82B are connected through the leads 83 passed through the through-holes 81 formed with an interval based on the divided groups mentioned above to the light emitting diode array 73 and the driver integrated circuit 74. For the purpose of soldering the composite metal members 82A and 82B to the ceramic substrate 72, the back surface of the ceramic substrate 72 is coated with a metal film. Therefore, predetermined widths of the composite metal members 82A and 82B can be provided on the back surface of the ceramic substrate 72 to provide a small sized optical printer head in which the composite metal members 82A and 82B have a function of heat-sink to radiate heat therefrom.

A printing mode in which all dots of a printing line are black was performed in an optical printer head in the fourth embodiment according to the invention. The result was that the difference of voltages applied to the light emitting diode array chip 73 and the driver integrated circuit 74 can be less than 0.2 V at both end terminals in the longitudinal direction of the ceramic substrate 72, and an unevenness of printing densities was not observed.

As understood from the explanations in the first to fourth embodiments according to the invention, advantages of the invention will be listed as follows.

(1) The light emitting surface of a light emitting diode array chip can be precisely positioned on a line including focal lengths of rod lenses for a rod lens array because two reference position levels are provided for setting a distance between the light emitting diode array chip and the rod lens array to be a predetermined distance.

(2) There is no necessity for adjusting a distance between the light emitting diode array chip and the rod lens array because the two reference position levels are provided. For this reason, a productivity can be much improved.

(3) The two reference position levels can be defined with a high precision so that a stabilized characteristic is obtained under a situation where a temperature is changed or vibrations are induced.

(4) A printing mode in which all dots of a printing line are black can be performed without difficulties because electric resistances of a common line and ground line patterns are much decreased in the presence of a composite metal member. For this reason, an unevenness of printing densities is not induced to provide a good printing quality.

Although the invention has been described with respect to specific embodiment for complete and clear disclosure, the appended claims are not to thus limited but are to be construed as embodying all modification and alternative constructions that may occure to one skilled in the art which fairly fall within the basic teaching herein set forth.

What is claimed is:

1. An optical printer head with a light emitting diode array comprising,
   a light emitting diode array chip for radiating exposure lights which is mounted on a substrate,
   a driver integrated circuit for driving said light emitting diode array chip which is also mounted on said substrate,
   a rod lens array which is provided at a position of a predetermined distance from the light emitting surface of said light emitting diode array chip, and
   means having two reference position levels at which said light emitting diode array chip and said rod lens array are held so that a distance between said light emitting diode chip and said rod lens array is set to be said predetermined distance on axes of lights radiated from said light emitting diode array chip.

2. An optical printer head with a light emitting diode array according to claim 1,
   wherein said means having said two reference position level is a main body having a hollow portion and arm portions, said hollow portion being formed with projections with which the top or back surface of said substrate is in contact when said substrate is positioned in said hollow portion, and said arm portions each being formed with a projections with which said rod lens array is in contact when said rod lens array is held between said arm portions.

3. An optical printer head with a light emitting diode array according to claim 1,
   wherein said means having said two reference position levels includes a plurality of spacer members each positioned between the top surface of said substrate and a reference surface of said rod lens array.

4. An optical printer head with a light emitting diode array according to claim 3,
   wherein said substrate and said spacer members are made of ceramic.

5. An optical printer head with a light emitting diode array according to claim 1 further comprising,
   an electric conducting member for decreasing an electric resistance of a common or ground line pattern provided on said substrate.

6. An optical printer head with a light emitting diode array according to claim 5,
   wherein said electric conducting member is a composite metal member which is composed of three layers including copper, invar and copper.

7. An optical printer head with a light emitting diode array according to claim 6,
   wherein said composite metal member is soldered to the surface of said common or ground line pattern.

8. An optical printer head with a light emitting diode array according to claim 6,
   wherein said composite metal member is soldered to the back surface of said substrate to be connected through leads which are passed through apertures provided in said substrate to said light emitting diode array chip or said driver integrated circuit.

* * * * *